United States Patent [19]

Salerno

[11] Patent Number: 4,835,649
[45] Date of Patent: May 30, 1989

[54] SELF-LATCHING CURRENT LIMITER

[75] Inventor: David C. Salerno, Bristol, Conn.

[73] Assignee: United Technologies Corporation, Hartford, Conn.

[21] Appl. No.: 132,759

[22] Filed: Dec. 14, 1987

[51] Int. Cl.$^4$ ............................................. H02H 9/02
[52] U.S. Cl. ..................................... 361/18; 361/101; 361/79; 323/276
[58] Field of Search ...................... 361/93, 18, 98, 100, 361/87, 79, 101; 323/276, 277, 278, 279

[56] References Cited

U.S. PATENT DOCUMENTS

| | | | |
|---|---|---|---|
| 3,399,338 | 8/1968 | Burgert et al. | 323/277 |
| 3,697,861 | 10/1972 | Frazier | 323/277 |
| 3,754,182 | 8/1973 | Morris et al. | 361/18 X |
| 4,017,789 | 4/1977 | Morris et al. | 361/18 X |
| 4,174,535 | 11/1979 | Mueller et al. | 323/277 X |
| 4,438,473 | 3/1984 | Cawley et al. | 361/18 |
| 4,575,673 | 3/1986 | Tedeschi et al. | 361/18 X |
| 4,593,338 | 6/1986 | Takeda et al. | 361/18 |

FOREIGN PATENT DOCUMENTS 8605926 10/1986 European Pat. Off. .............. 361/18

Primary Examiner—M. H. Paschall
Assistant Examiner—A. Jonathan Wysocki
Attorney, Agent, or Firm—Francis J. Maguire, Jr.

[57] ABSTRACT

A resettable current limiter is started using an externally generated reset signal, latches on and continues conducting until an overload current is sensed, at which time the limiter shuts off load current. An FET is used both as a series pass element and a load current sensing element. A comparator senses the source of drain voltage drop across the FET and provides a shutdown signal to the FET's gate upon sensing an overload. The limiter may also comprise a solid state switch for positively shutting off the FET using an externally generated off signal. The reset signal reponse circuitry may be set up to be edge triggered to protect against an external short. The reset signal may be a level change or may be a periodic signal. A zener diode may be used for both protecting the FET against excessive voltages and against current surges.

4 Claims, 1 Drawing Sheet

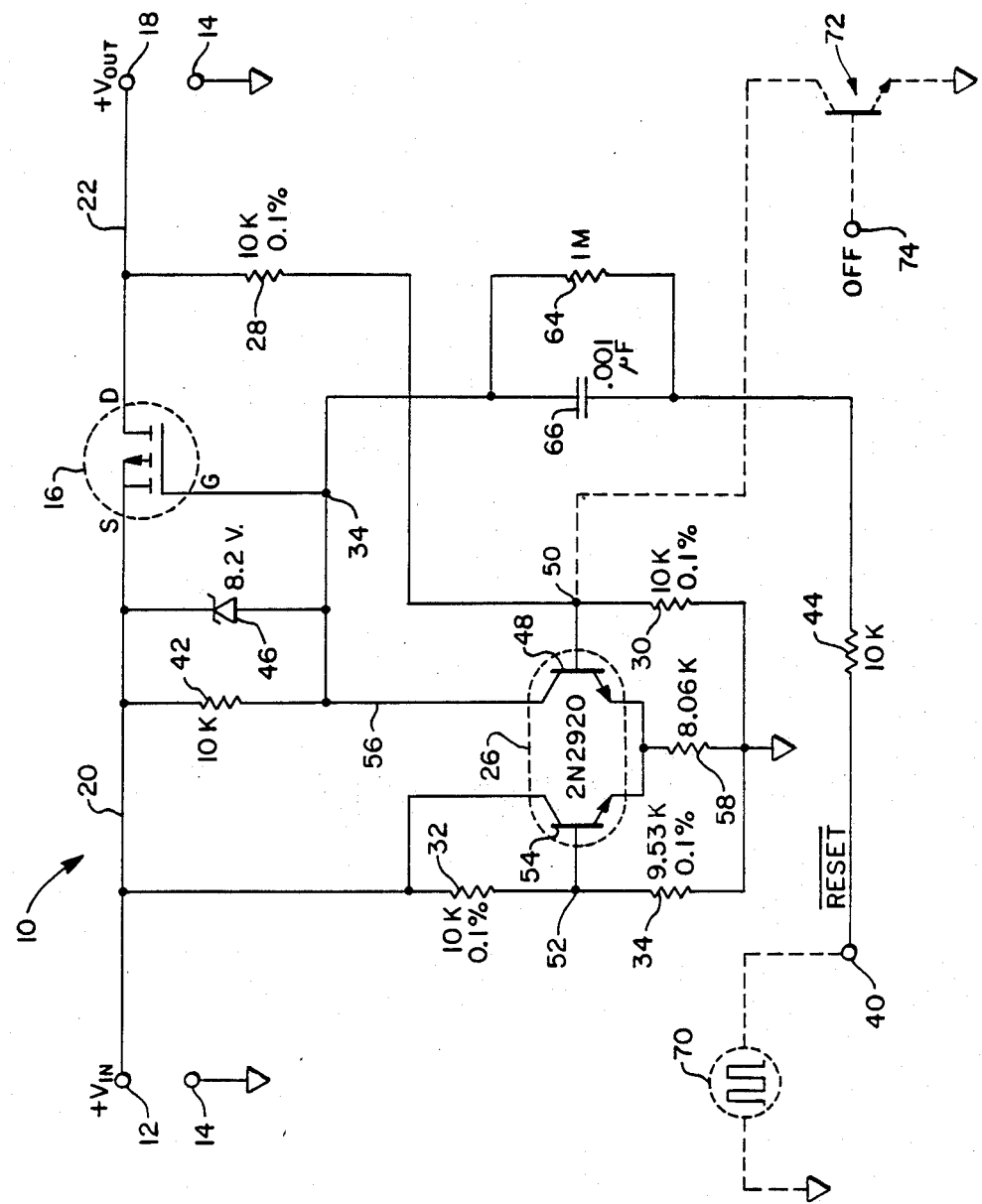

SELF-LATCHING CURRENT LIMITER

TECHNICAL FIELD

This invention relates to electronic circuits and, more particularly, to current limiting.

BACKGROUND ART

Current limiting circuits are often employed when driving a load, to prevent component damage in the event of an overload, such as short circuit. One common technique is to limit the current to some maximum value. The major problem with this method is that under short circuit conditions, the controlling element is subjected to the full limiting current and the full input voltage. This can result in very high power dissipation, which can destroy the limiter.

Another method is fold back current limiting. This technique uses a design which passes circuit up to some "trip" level, and above that level starts to cut back on the output voltage. The design is such that as the output voltage cuts back, the trip current is lowered. This positive feedback condition results in little or no output voltage from the current limiter and little or no current flow. After the overload is removed, the circuitry should recover and provide full output current once again, up to the trip level. A problem with this technique is unreliable startup into loads which draw a surge current, such as capacitors and incandescent lamps.

Both of the methods discussed also lack a means of indicating that an intermittent overload has occurred.

What is needed is a circuit which will efficiently provide output current up to a preset level and, in the event of an overload, shutoff completely and remain in the off state until reset. When in the off state, no current should flow and no power should be dissipated.

DISCLOSURE OF INVENTION

The object of the present invention is to provide an efficient current limiter.

According to the present invention, a current limiter comprises a field effect transistor which acts as both a series pass element and a load current sensor. An input voltage is applied to the FET for conducting current to a load. A voltage drop across the FET is indicative of the magnitude of the load current. The FET is also responsive to a reset signal for initiating the flow of load current. Once current flow commences the FET is also responsive to a control signal for continuing the flow of load current after initiation. The control signal is provided by a current limit control means which is responsive to the voltage drop across the FET for monitoring the magnitude thereof and for providing the control signal only for so long as the FET voltage drop remains below a selected magnitude. Once the load current increases so as to cause the voltage drop across the FET to increase above the selected magnitude the current limit control means stops providing the control signal and the FET ceases conducting load current.

In further accord with the present invention, a zener diode is also responsive to the input voltage for conducting load current away from the FET above a selected input voltage magnitude. The zener diode also serves to protect the FET from input voltages above the selected input voltage magnitude.

In still further accord with the present invention, the current limiter may be fitted with an additional transistor switch, responsive to an off command signal for causing the voltage drop across the FET to appear greater than the selected magnitude, thereby causing the current limit control means to cease providing the control signal which in turn causes the load current to stop flowing.

In still further accord with the present invention, the reset signal can be a low frequency clock signal (e.g., less than 1 kilocycle) which will provide a continuous output with a current limit which is "transparent,", i.e., does not need to be monitored and reset because it will automatically reset one clock period after the overload is gone.

In still further accord with the present invention, the reset signal is provided to the FET through a resistor-capacitor (RC) circuit in order to make the reset signal edge-triggered. This means that a shorted reset input node will not harm the current limiting function.

The present current limiter uses very little power when on due to the fact that there is no current sensing element other than the series pass element itself. One embodiment of the present invention uses only 12 parts, 5 of which can be chips, operates from 0 to 2 amps continuous, or up to 5 amp pulsed at 25% duty cycle, and utilizes a quiescent current of only 5 milliamps at 28 volts input.

This same embodiment has a FET series pass element with a low forward voltage drop of only about 0.3 volt per amp. The limiter of the disclosed embodiment can operate from +15 to +50 VDC. It responds in less than 50 microseconds. It has an easily adjustable trip current point which varies proportionately with line voltage which makes it ideal for resistive loads. Moreover, the reset signal capability quarantees startup into capacitive loads by holding the circuit on for as long as desired. The circuit can easily be made into a switch by adding an off command as disclosed. Moreover, it can be clocked repeatedly to give automatic recovery after a short, or it can be set to wait until reset.

The use of a zener at the input (as shown from gate to source in the embodiment disclosed) limits peak current until a trip occurs.

The FET "on" resistance has a positive temperature coefficient which provides inherent thermal protection, lowering the trip current point with increasing temperature.

The use of the disclosed edge triggered reset input provides short circuit protection at the reset input node.

These and other objects, features and advantages of the present invention will become more apparent in light of the following detailed description of a best mode embodiment thereof, as illustrated in the accompanying drawing.

BRIEF DESCRIPTION OF THE DRAWING

The sole FIGURE illustrates a current limiter, according to the present invention.

BEST MODE FOR CARRYING OUT THE INVENTION

The FIGURE illustrates a current limiter 10, according to the present invention. An input source voltage Vin is applied at a node 12 (with respect to a ground or common node 14) and current is permitted to flow through a series pass element 16 to a load (not shown) connected between an output node 18 and the ground or common node 14. The series pass element is a field-effect-transistor (FET) which may be an enhancement, p-channel type, as shown, or which may be of the n-channel type also (if the input voltage were negative in polarity, or if the source and drain connections are reversed, as shown in E.P.O. publication WO86/05926 by B. G. Bynum et al). A typical device 16 might be, for example, an IRFF9130 (JTXLb 2N6849). Of course, the series pass element 16 may be of the depletion type also, whether n or p-channel type. The details of the circuit hookup would change according to the type of FET selected and thus it will be understood that the hookup shown is for one specific type only but that other hookups using the other types would be equivalent.

The input current is conducted on a line 20 from the input voltage node 12 through the series pass element 16 out to the load on a line 22.

FETs have a small "on" resistance which will cause a small voltage drop to develop across the series pass element 16 which may be used advantageously, according to the present invention, to monitor the magnitude of the load current conducted via lines 20 and 22 to the load.

The means of doing this may be by any of a variety of circuits but the embodiment shown in the FIGURE utilizes, without limitation, a bridge circuit (a pair of voltage dividers) for a current limit control means, along with a matched transistor pair 26 (connected in common electrode configuration), acting as a differential voltage comparator. The bridge circuit comprises the "on" resistance of the series pass element 16, three separate 10K resistors 28, 30, 32 (each having a precision of 0.1%) and a 9.53K resistor 34, also having a precision of 0.1%.

When voltage is first applied at node 12, FET 16 will be off. This can be done by having node 40 connected to a reset transistor's (not shown) collector which is open. A momentary ground through the reset transistor at the node 40 may then be applied. This turns FET 16 "on" by imposing a voltage across a resistor 42 which exceeds the gate (G) to source (S) threshold voltage of the FET 16. This pulse can be provided in many ways, e.g., an open collector driver (as mentioned) or a manual push button switch at node 40. It will be understood that the reset pulse need not even be a pulse but could be a level (which would have to be taken away before being used again, of course).

A resistor 44 is provided to form a voltage divider with resistor 42 when the reset input node 40 is low. This limits the voltage across resistor 42, because most power MOSFETs (if used for series pass element 16) can be easily damaged with a gate-to-source voltage above 20 volts. Since the threshold voltage which must be exceeded is usually only 3 to 5 volts, resistors 42, 44 can be chosen to provide a safe but sufficient gate-to-source voltage for a given input voltage magnitude. In addition, a zener diode 46 can be placed across resistor 42 to limit the gate-to-source voltage to a safe value to accommodate a wide range of input voltages. In this case, resistor 44 acts to limit the zener current.

Once FET 16 is turned on, voltages will be present at both bases of the transistor pair 26. The resistive voltage divider formed by resistors 28, 30, 32, 34 is such that the voltage at the base (control electrode) of a transistor 48 at a node 50 is slightly larger than that at a base node 52 of a transistor 54. This is accomplished simply by making the ratio of resistor 30 to resistor 28 slightly larger than that of resistor 34 to resistor 32. This turns transistor 48 "on" and transistor 54 "off." The collector current flowing in transistor 48 via a line 56 flows through resistor 42 and a resistor 58 to ground. This maintains a voltage drop across resistor 42 and keeps FET 16 "on" after the reset pulse at node 40 is gone, thus providing current to the load in a continuous manner.

If a large enough load current should flow, the voltage drop across FET 16 will be such that the base of transistor 54 will become more positive than the base of transistor 48. This is the "trip" current point. This will turn transistor 54 "on" and transistor 48 "off." Current will now cease to flow in resistor 42 and the gate to source voltage of the FET 16 will fall towards 0. This causes FET 16 to turn off and the output voltage to drop. As in foldback current limiting, as the output voltage drops, the "trip" current also drops. When the output voltage nears 0 volts, transistor 48 is completely cutoff and the FET 16 is therefore "off." The current limiter will remain in this zero power "off" state indefinitely until another reset pulse is applied at node 40.

The time required for the reset action to take place is a function of the values of resistor 42 and 44, the gate to source capacitance of FET 16, and the magnitude of $V_{in}$. Typical values are 1 to 10 microseconds.

The time for the current limiter to "trip off" is a function of the magnitude of the overload, the values of resistors 42 and 58 and the gate-to-source capacitance of FET 16. typical shutoff times for a short circuit are 10 to 50 microseconds. It takes longer (100 microseconds) to trip if a "soft short" (say 100% overload) is applied.

It is the slight delay which enables the circuit to drive a capacitive load. In addition, since the reset input overrides the current limiter function, a longer reset pulse may be provided to drive in any startup load necessary, such as an incandescent bulb.

Note that the absence of a current sense resistor minimizes voltage drop and power loss. Also, the various resistors in the circuit can all be chosen to have large values (typically in the 10K range) so that the circuit's power consumption, when the current limiter is "on" is very small.

A resistor 64 and a capacitor 66 are shown hooked up in parallel in the reset circuit. This RC circuit renders the reset input "edge-triggered" which ensures that even if the reset input node 40 is shorted there will be continued functionality in the current limiter itself since the capacitor and resistor (chosen to be very large, e.g., 1 megohm) will protect the current limiter as a sort of buffer.

It will be observed that a FET 16 has an inherent positive temperature coefficient of resistance which, in this context, provides an inherent advantage, lowering the trip current point upon increasing temperature in the device itself.

It has already been mentioned that the zener diode 46 can be selected to provide gate-to-source voltage protection for the FET 16 but it should also be realized that the zener can be further selected to provide a short term linear current limit function such as that described and claimed in U.S. Pat. No. 4,593,213, issued to Vesce et al.

Connecting the reset node 40 to a low frequency clock, e.g., less than one kilocycle, as shown by a dashed source 70, will provide a continuous output with a current limit which is "transparent," i.e., does not need to be monitored and reset. It will automatically reset one clock period after the overload is gone. The dispensing of the need for monitoring reduces expense in many cases.

A further improvement to the present invention is shown by a dashed transistor 72 shown connected at its collector to node 50 which is responsive to an "off" signal at a node 74. This transistor can be used to command the limiter to an off condition. This make the limiter operate as a latching switch which can be commanded on (reset) or off in addition to the latching current limit feature.

Although the invention has been shown and described with respect to a best mode embodiment thereof, it shoud be understood by those skilled in the art that the foregoing and various other changes, omissions, and additions in the form and detail thereof maybe made therein without departing from the spirit and scope of the invention.

I claim:

1. A self-latching current limiter which limits load current delivered from an input source voltage referenced to a common node to a load referenced to said common node, comprising:
    a field effect transistor having a gate and a pair of electrodes including a source and a drain, one of said electrodes connected to said source voltage and the other of said electrodes connected to said load;
    a transistor pair connected in common electrode configuration, each having a control electrode, a first one of said pair connected between said common node and said gate to conduct current from said common node to said gate, and a second one connected between said common node and said source voltage;
    a pair of voltage dividers, each having a junction at which the voltage is a fraction of the voltage across the whole voltage divider, a first one of said voltage dividers connected between said load and said common node and a second one of said voltage dividers connected between said source voltage and said common node, the control electrode of said first transistor being responsive to the voltage at the junction of said first voltage divider and the control electrode of said second transistor being responsive to the voltage at the junction of said second voltage divider, said voltage dividers being adjusted in a manner to cause said first transistor to conduct and said second transistor to not conduct in response to the voltage at said load when said field effect transistor is conducting current in a normal manner to said load, and to cause said first transistor to become nonconductive and said second transistor to become conductive in response to voltage at said load being of a value indicative of a current flow through said field effect transistor greater than a predetermined permissible magnitude;
    a resistor between said source and said gate responsive to current flow through said first transistor to develop a source-to-gate voltage sufficient to cause said field effect transistor to conduct normally; and
    reset means for selectively causing current flow in said resistor to develop a source-to-gate-voltage to initialize normal current flow in said field effect transistor.

2. The current limiter according to claim 1 wherein said reset means comprises means for connecting said gate to said reference node through a capacitor which is shunted by a resistor.

3. The current limiter according to claim 1 wherein said reset means comprises means for causing said current flow in said resistor periodically.

4. The current limiter according to claim 1 further comprising shutoff means for selectively connecting the control electrode of said first transistor to said reference node, whereby to cause it, and in turn said field effect transistor, to cease conducting.

* * * * *